United States Patent
Pilat, Jr.

(10) Patent No.: US 7,104,645 B2
(45) Date of Patent: *Sep. 12, 2006

(54) EYEGLASS FRAME ASSEMBLY

(76) Inventor: James F. Pilat, Jr., 309 W. 57th St., Apt. 1001, New York, NY (US) 10019

(*) Notice: Subject to any disclaimer, the term of this patent is extended or adjusted under 35 U.S.C. 154(b) by 0 days.

This patent is subject to a terminal disclaimer.

(21) Appl. No.: 10/610,862

(22) Filed: Jun. 30, 2003

(65) Prior Publication Data

US 2004/0008318 A1 Jan. 15, 2004

Related U.S. Application Data

(63) Continuation-in-part of application No. 10/269,811, filed on Oct. 11, 2002, now Pat. No. 6,595,634.
(60) Provisional application No. 60/394,837, filed on Jul. 10, 2002.

(51) Int. Cl.
    *G02C 1/00* (2006.01)
(52) U.S. Cl. .............................. 351/41; 351/92; 351/103
(58) Field of Classification Search ................ 351/92, 351/103, 41, 83, 86, 90, 104–109
    See application file for complete search history.

(56) References Cited

U.S. PATENT DOCUMENTS

| | | | | |
|---|---|---|---|---|
| 1,358,200 | A | * | 11/1920 | Hansen |
| 4,523,819 | A | * | 6/1985 | Dianitsch et al. |
| 4,685,782 | A | * | 8/1987 | Lhospice |
| 4,822,158 | A | * | 4/1989 | Porsche |
| 5,355,184 | A | * | 10/1994 | Varveris et al. |
| 5,867,244 | A | | 2/1999 | Martin |
| 6,089,706 | A | | 7/2000 | Pilat, Jr. |
| 6,099,119 | A | * | 8/2000 | Kim |
| 6,139,142 | A | | 10/2000 | Zelman |
| 6,343,858 | B1 | | 2/2002 | Zelman |
| 6,595,634 | B1 | * | 7/2003 | Pilat, Jr. ............. 351/41 |
| 2005/0007546 | A1 | * | 1/2005 | Pilat et al. |

FOREIGN PATENT DOCUMENTS

| | | | |
|---|---|---|---|
| DE | 34 13 827 A1 | * | 8/1985 |
| EP | 0 955 560 | * | 11/1999 |
| GB | 812880 | * | 5/1959 |
| JP | 60-146217 | * | 8/1985 |
| WO | WO 03/040809 | * | 5/2003 |

* cited by examiner

*Primary Examiner*—Hung Xuan Dang
(74) *Attorney, Agent, or Firm*—Knobe Martens Olson & Bear LLP

(57) ABSTRACT

A specially designed eyewear system is provided. The frame or clip element utilizes multi-filament cable in order to define the lens openings. Such cable is both flexible and strong so that it can easily wrap around the lens elements during assembly. Various types of locking units or assemblies can be used once the cable is wrapped around the lens element in order to maintain engagement of the cable around the lens.

23 Claims, 11 Drawing Sheets

EYEGLASS FRAME ASSEMBLY

RELATED APPLICATIONS

This application claims priority benefit to provisional application Ser. No. 60/394,837 filed on Jul. 10, 2002 and is a continuation in-part of application Ser. No. 10/269,811, filed Oct. 11, 2002, now U.S. Pat. No. 6,595,634; both are incorporated herein by reference.

BACKGROUND OF THE INVENTION

This invention relates to an optometric device, and more particularly, to a customized eyewear unit or assembly. The invention also relates to a specially designed eyeglass frame.

As is well known, millions of individuals wear glasses, including sunglasses, in order to improve their vision and comfort. Sunglasses, of course, reduce glare and shade the eyes of the wearer. Sunglasses on the market have various designs and styles, which oftentimes can create a certain "look."

For those individuals who do not require corrective eyeglass lenses, a variety of low cost sunglasses may be purchased from various stores and retail chains. However, for those many individuals who are nearsighted, farsighted, or otherwise have poor vision, and therefore wear corrective eyeglasses on a routine basis, a separate pair of prescription sunglasses is required, which can be very expensive. This is especially so for those individuals whose prescriptions change on a frequent basis; those individuals not only must purchase a regular pair of eyeglasses each time, but must also purchase a separate pair of sunglasses each time.

Clip-on sunglasses are a low cost option to prescription sunglasses. In general, clip-on sunglasses are attached or otherwise "clipped" onto conventional prescription eyewear in order to convert the eyewear into sunglasses. Nonetheless, although clip-on sunglasses are much more cost effective than purchasing prescription sunglasses, clip-on sunglasses are less than desirable, in part because they are normally manufactured in a limited number of designs, sizes and shapes which may or may not conform to the lens design of the eyeglasses worn by the individual.

Accordingly, it would be desirable to provide clip-on sunglasses which are customized in design in order to coordinate with a person's regular eyeglasses.

SUMMARY OF THE INVENTION

Generally speaking, in accordance with the invention, a customized eyewear assembly, such as a sunglass clip assembly, is provided. The assembly includes a clip or frame element comprising a central tension bar having first and second opposite ends, as well as a pair of flexible wires each having a first end attached to one of the ends of the tension bar and a second free end selectively feedable through and lockable by a corresponding locking unit. The locking unit is either fixed to the tension bar or is, alternatively, coupled to the temple members. Each wire is designed for wrapping around a lens that is cut out to a desired shape and size. Preferably, the wire is a multi-filament cable wire.

In use, the optician first prepares or cuts a pair of lenses. Each wire is wrapped around one of the cut-out lenses. Then, the free end of the wire is fed through a corresponding locking assembly where it is engaged. In assembly, excess wire is cut off after engagement with the lock assembly.

Also in accordance with the invention, a specially designed eyewear frame or specially designed clip element is provided. The frame or clip element utilizes multi-filament cable in order to define the lens openings. Such cable is both flexible and strong so that it can easily wrap around the lens elements during assembly. Various types of locking units or assemblies can be used once the cable is wrapped around the lens element in order to maintain engagement of the cable around the lens—this is especially important since the cable is typically sized to fit around the particular lens that has been selected such that excess cable is cut away.

Accordingly, it is an object of the invention to provide an improved customized eyewear assembly.

It is also an object of the invention to provide an improved eyewear frame assembly.

Another object of the invention is to provide an improved eyewear assembly having an eye wire locking mechanism.

Yet a further object of the invention is to provide a sunglass clip assembly which is inexpensive to manufacture and purchase, as well as user friendly.

Another object of the invention is to provide an improved eyeglass frame design that utilizes multi-filament cable wire.

Still another object of the invention is to provide an improved eyewear assembly which is fabricated using conventional tooling.

A further object of the invention is to simply provide an improved assembly which can be produced by an optician in a relatively short period of time.

Still other objects and advantages of the invention will in part be obvious, and in part be apparent from the following description.

The invention accordingly comprises the system and assembly possessing the features, properties and relation of elements which are exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE PREFERRED EMBODIMENTS

Figure 1:
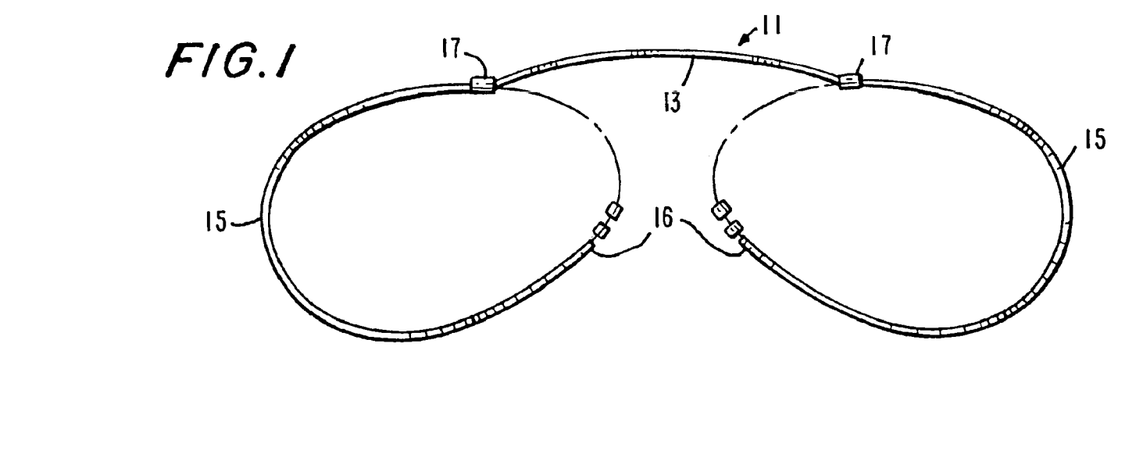
FIG. 1 is a front elevational view of an unfinished clip unit of the inventive sunglass clip assembly.

Referring first to FIG. 1, a clip element or unit generally indicated at 11 and used in making the customized clip assembly of the invention is shown.

Clip element 11 includes a tension bar 13 made from a metal, metal alloy or metal composite composition and a pair of flexible and bendable wires 15 arcuately extending from either end of tension bar 13. Each of wires 15 is made from a metal, metal alloy or metal composite and is constructed to be extremely pliable so that it can easily wrap around a sunglass lens, as described below. Each wire has a free end 16 which, during assembly, is fed through a corresponding screw locking unit 17 located at either end of tension bar 13, as further described later on.

Figure 3:
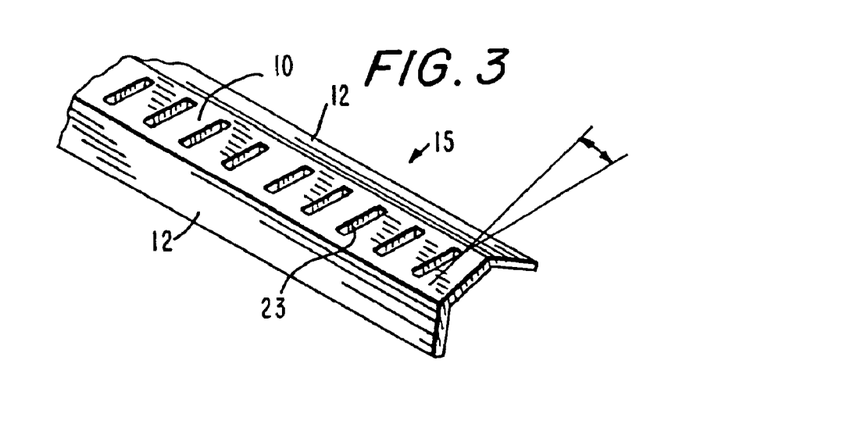
FIG. 3 is an enlarged perspective view of a portion of the wire that is used in the inventive sunglass clip assembly.
Figure 4:
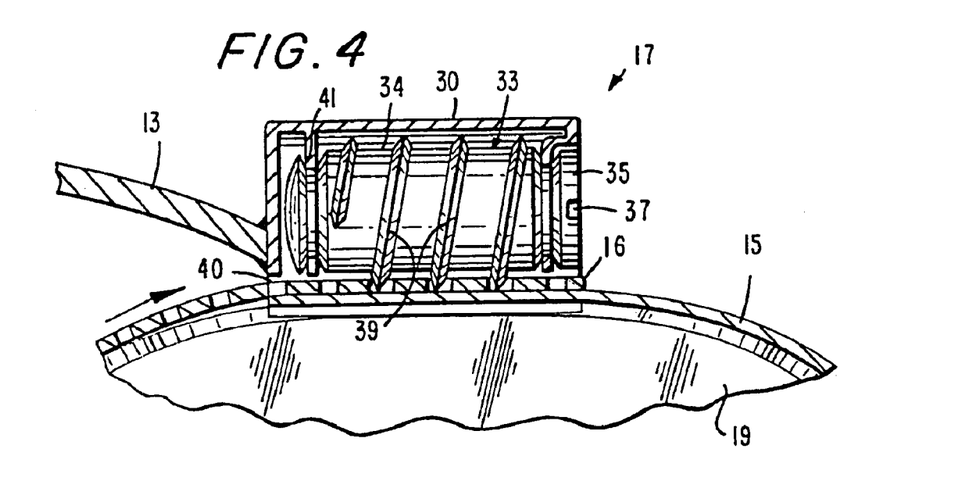
FIG. 4 is a cross-sectional view of the screw locking unit of the inventive sunglass clip assembly.

Referring now to FIG. 3, as well as to FIG. 4, each wire 15 is now better described. Wire 15, which may be a multi-filament cable wire, as described in detail hereinafter, comprises a longitudinally extending main wall 10 and a pair of longitudinally extending sidewalls 12, which together are sized for wrapping about and otherwise grabbing the edge wall of a sunglass lens 19 (see FIG. 4) during production of the inventive sunglass clip assembly. Front wall 10 is formed with a plurality of running grooves 23 which are grabbed by the screw of locking unit 17 during final assembly of the inventive system (see FIG. 4 once again), as described later on.

Figure 6:
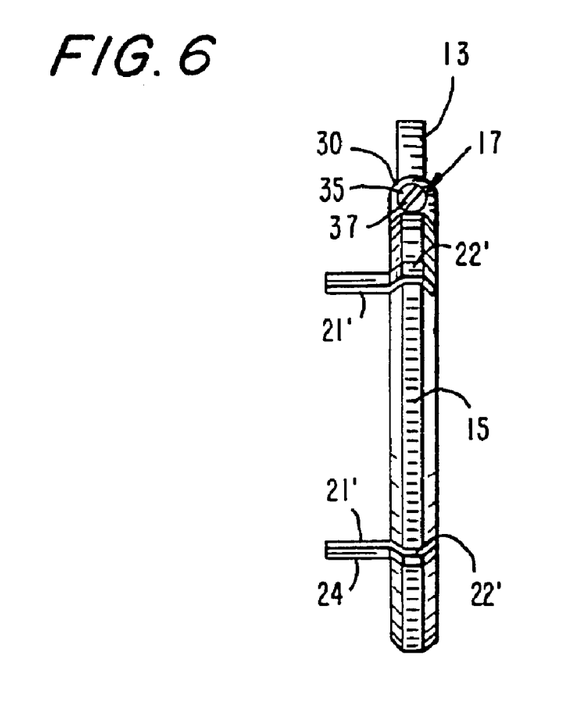
FIG. 6 is a side elevational view of the sunglass clip assembly.

Referring now in particular to FIG. 4, as well as FIG. 6, each of screw locking units 17 is now described in greater detail. Each of screw locking units 17 is fixed at one of the ends of tension bar 13 (see FIG. 1) and is defined by a tubular-shaped housing 30. Housing 30 is made of stainless steel, carbide, titanium, or some other high performance metal and contains a metal screw member generally indicated at 33 having a body 34 formed with a plurality of outer annular threads 39, and a head 35 at one end formed with single slot 37. Slot 37 is sized for receiving the end of a conventional screwdriver in order to selectively turn screw member 33 so as to lock wire 15 therewith, as described hereinafter.

Housing 30 of locking unit 17 is formed with a passage 40 running therethrough that is sized for selectively receiving free end 16 of wire 15 as screw member 33 is turned. Housing 30 also includes an integrally formed stop 41 which prevents translational movement of screw unit 33 from sliding or otherwise moving in either lateral direction.

Figure 5:
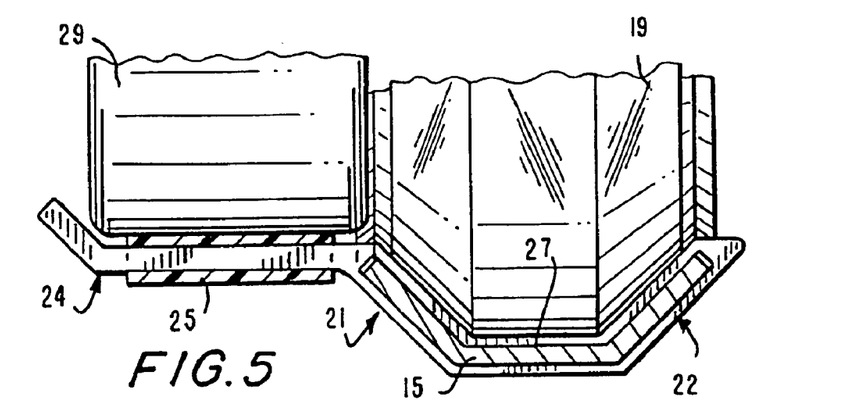
FIG. 5 is a cross-sectional view showing the bottom hook unit of the inventive sunglass clip assembly.

FIG. 5 describes in more detail a first embodiment of each of hook assemblies 21 which are used to maintain overlying engagement of the inventive sunglass clip assembly when placed or worn over a pair of conventional eyeglasses during use. Hook assembly 21 includes a first sunglass hook element generally indicated at 22 and a second eyeglass hook element generally indicated at 24. Hook element 22 includes a slot 27 through which wire 15 runs (also see FIG. 2) and is sized for fitting underneath sunglass lens 19.

Eyeglass hook element 24 of hook assembly 21 is formed with a cushion 25 disposed therearound on which an eyeglass frame 29 can sit, as shown in FIG. 5. As can be appreciated from viewing FIG. 5, hook assembly 21 enables the inventive sunglass clip assembly to be aligned with the eyeglass frame of the prescription eyeglasses during use.

Figure 2:
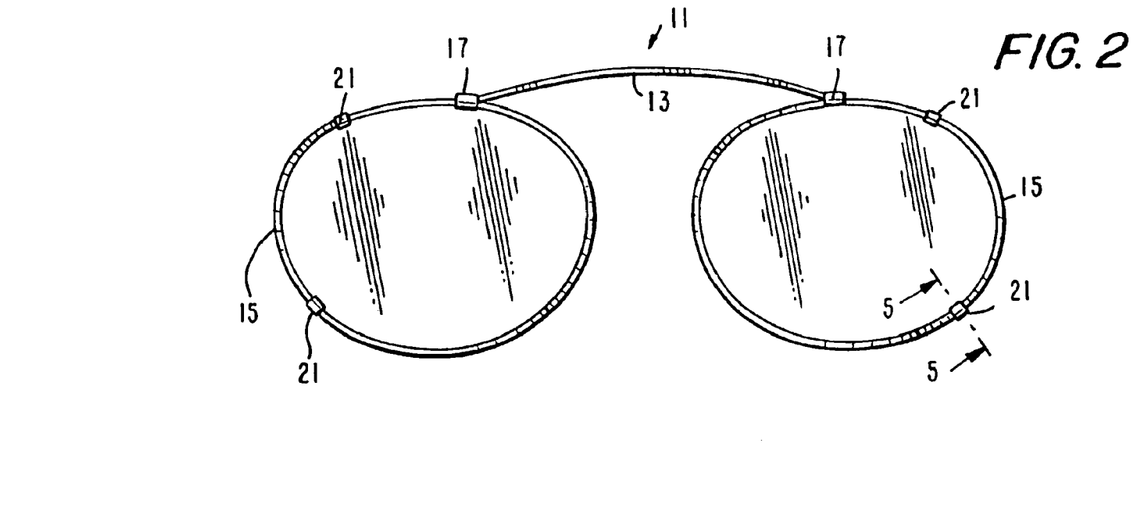
FIG. 2 is a front elevational view of the finished sunglass clip assembly of the invention.

In assembly, an optician first prepares a pair of sunglass lenses 19 identical in size, shape and design to the lenses of a wearer's regular eyeglasses. Then, utilizing clip unit 11 depicted in FIG. 1, each wire 15 first fed through slot 27 of hook assembly 21, and then wrapped around lens 19. Then, free ends 16 of each wire 15 are fed into passage 40 of corresponding locking unit 17 (see FIG. 4). By turning screw member 33, as described before, threads 39 engage or grab end 16 of wire 15 along running grooves 23 in order to lock end 16 into locking unit 17. As a result, a custom sunglass clip assembly as depicted in FIG. 2 is produced.

Alternatively, locking unit 17 may be used in the assembly of an eyeglass frame itself in which the lens openings are defined by a flexible eyewire such as multi-filament cable wire, as described hereinafter.

Figure 7:
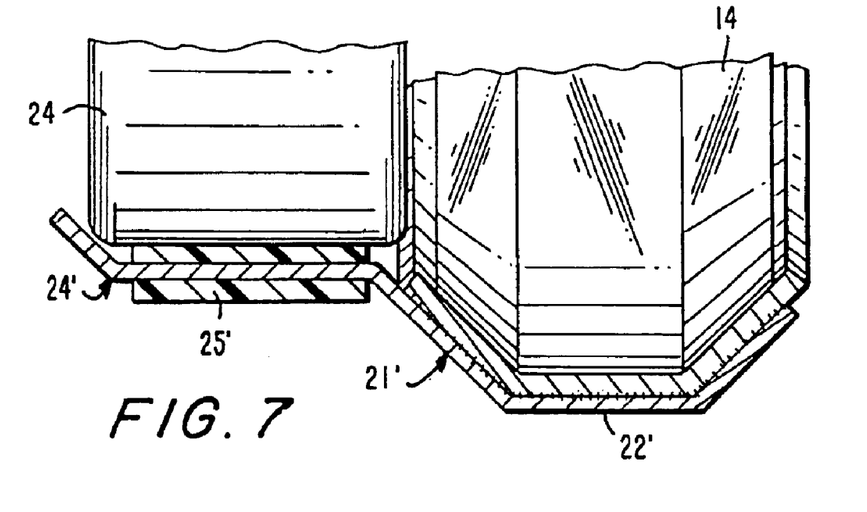
FIG. 7 is a cross-sectional view of an alternative version of the hook unit as depicted in FIG. 6.

FIGS. 6 and 7 describe in more detail an alternative version of the hook assembly, generally indicated at 21'. Hook assembly 21' comprises a first sunglass hook element 22' and a second eyeglass hook element 24'.

Hook element 22' is formed integrally and continuous with wire 15, as shown in FIG. 6. Hook element 24' is identical to hook element 24 depicted in FIG. 5 and has a cushion 25' disposed thereabout. In this embodiment, a pair of hook assemblies 21' are used. Assembly of the invention is as described above.

As can be appreciated with respect to the embodiments or with respect to of FIGS. 1–7, or with respect to using the locking unit during assembly of an eyeglass frame itself, most often during assembly, there will be excess wire. Typically, the excess wire is first cut to a length that is sufficient for wrapping around the sunglass lens and locking at its end within its respective locking unit.

Figure 8:
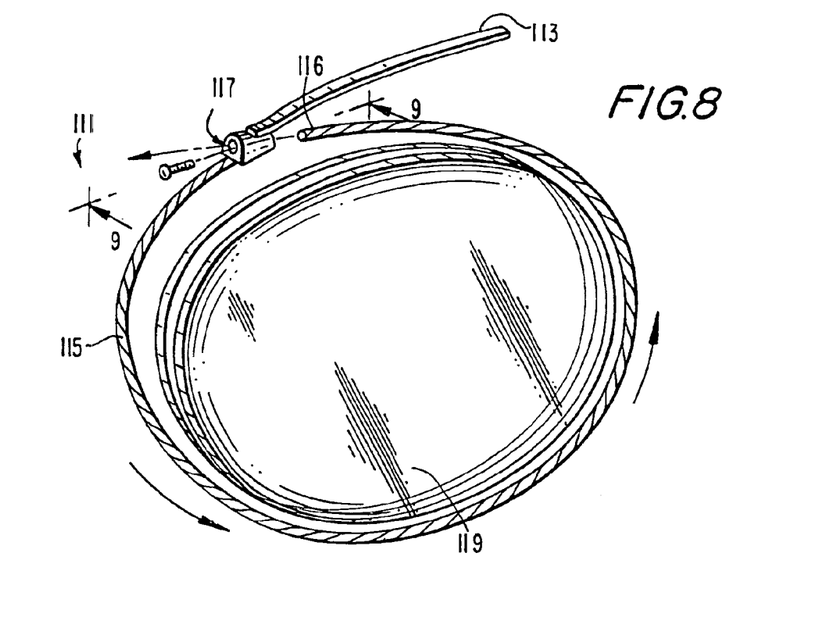
FIG. 8 is a perspective view of a second embodiment of a portion of an unfinished clip unit of the inventive sunglass clip assembly.
Figure 9:
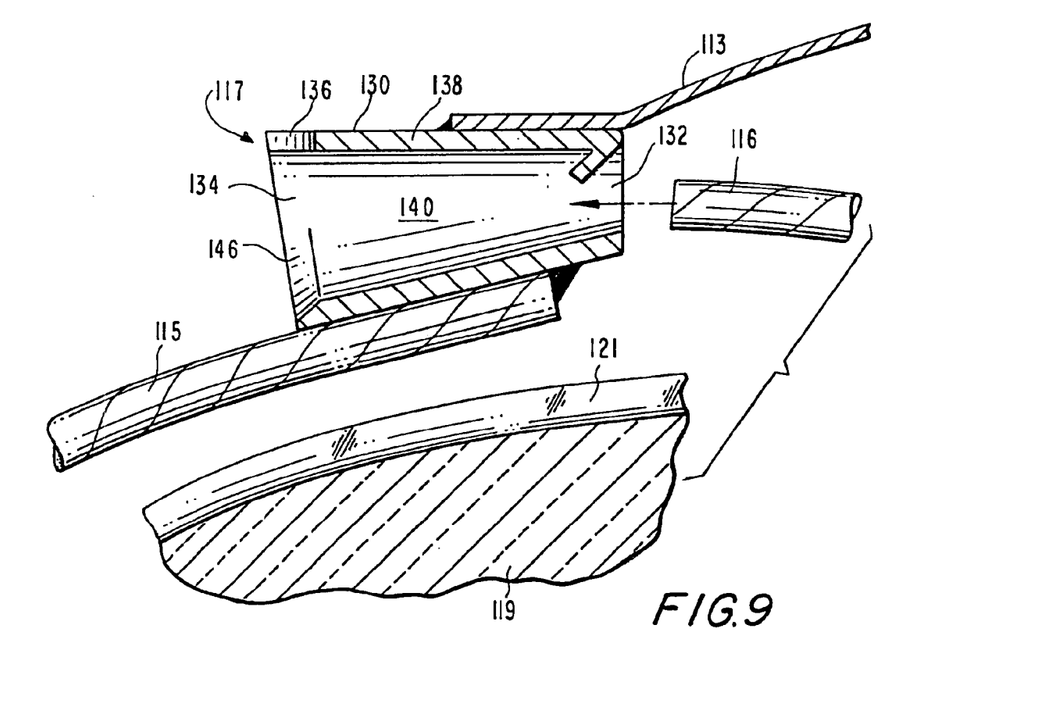
FIG. 9 is a cross-sectional view taken along line 9—9 of FIG. 8.
Figures 13, 14:
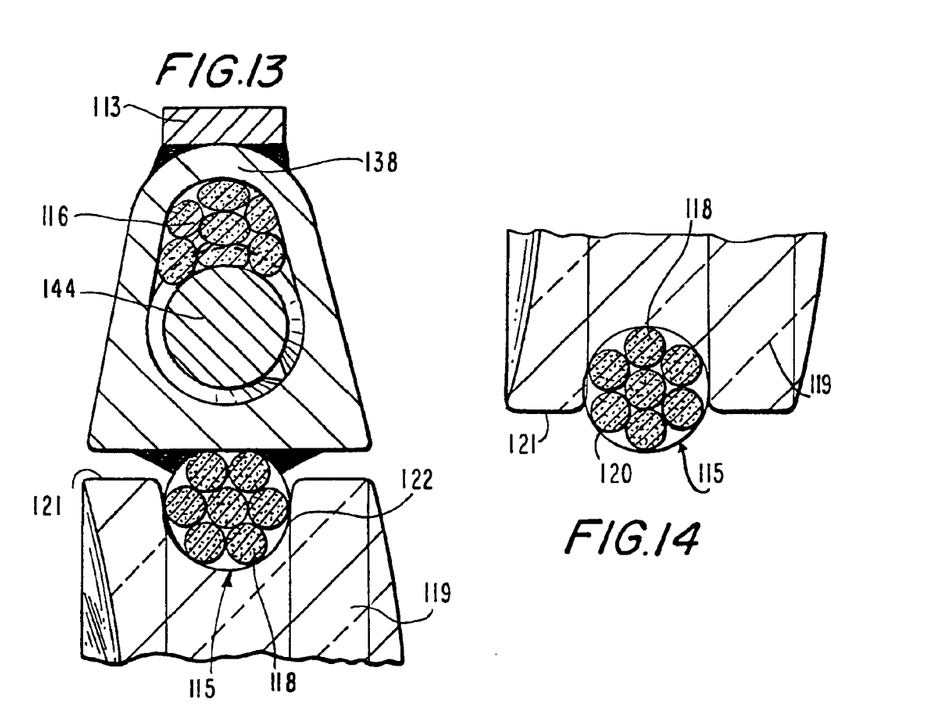
FIG. 13 is a cross-sectional view taken along line 13—13 of FIG. 12.
FIG. 14 is a cross-sectional view taken along line 14—14 of FIG. 11.

Referring now to FIGS. 8 and 9, a second embodiment of a clip element or unit generally indicated at 111 and used to make the customized sunglass clip assembly of the invention as shown. Clip element 111 includes a tension bar 113 made from a metal, metal alloy or metal composite composition and a pair of flexible and bendable wires 115 arcuately extending from either end of tension bar 113. Each wire 115 is made from a multi-filament material such as a multi-filament cable wire, preferably made from a metal or metal alloy, but also from a nylon, polymer, resin, natural fiber or other naturally occurring or man-made material, as is well known. Wire 115 may also be made from a fiber-optic material. The preferred multi-filament material is a multi-filament cable wire comprising a plurality of filaments 118 (see FIG. 14), and retained in a casing 120, which, by way of example only, can be selected from fishing leader wire. Such cable wire is extremely flexible and strong so that it can easily wrap around a sunglass lens in a secure fashion, as described below. Preferably, the multi-filament cable wire has a thickness of between 0.4 and 1.6 mm, and more preferably of between 0.4 and 0.6 mm. The multi-filament cable wire used in the inventive system has superior flexibility and strength as compared to conventional wires, making assembly easier, as described hereinafter.

Each wire 115 has free end 116 which, during assembly, is fed through a corresponding locking unit 117 located at and attached to the ends of tension bar 113 (see FIG. 9). Wire 115 is sized for wrapping about and otherwise grabbing outer edge 121 of sunglass lens 119 (see FIG. 10) during production of the inventive sunglass clip assembly. Significantly, outer edge 121 of sunglass lens 19 is formed with a groove 122 (see FIGS. 13 and 14) along which wire 115 is abutingly received.

Figure 10:
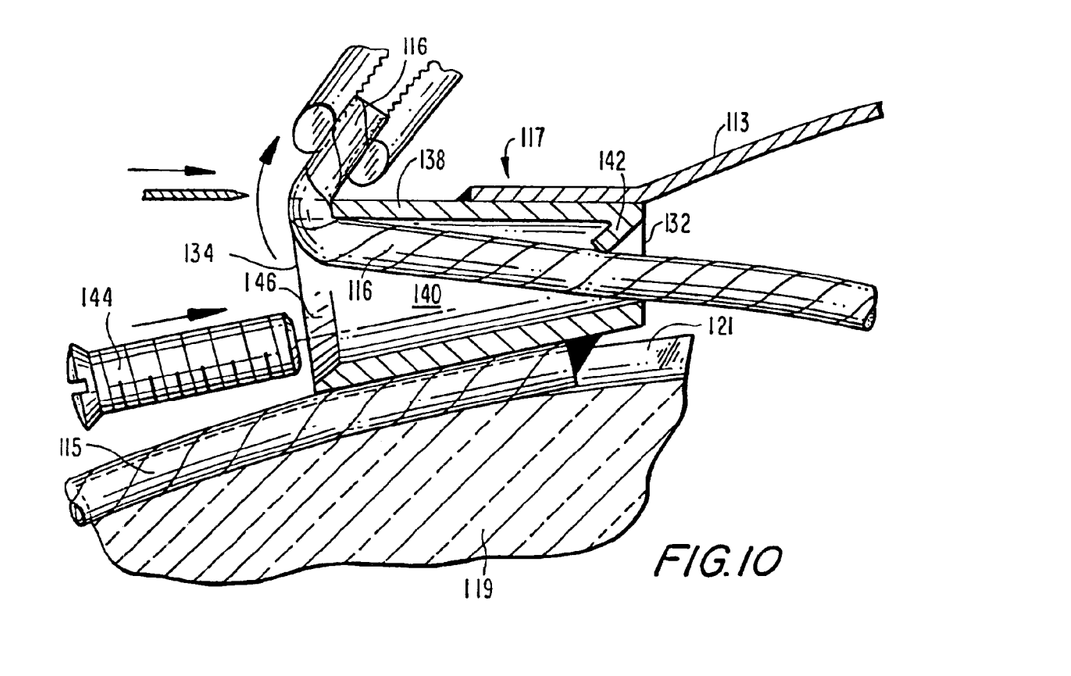
FIG. 10 is a cross-sectional view similar to FIG. 9 and showing assembly of the second embodiment of the inventive sunglass clip assembly.
Figure 11:
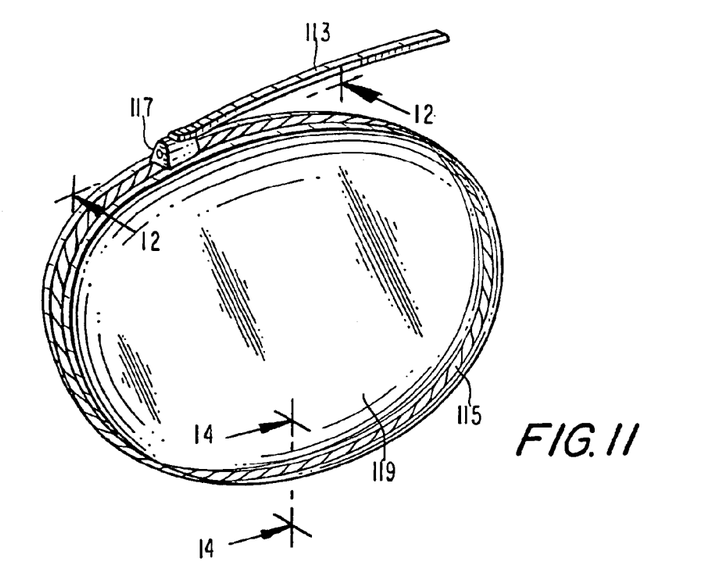
FIG. 11 is a perspective view of a portion of the second embodiment of the finished sunglass clip assembly of the invention.

As shown in FIGS. 9 and 10, locking unit 117 is fixed at one of the ends of tension bar 113 and is defined by a housing 130. Housing 130 includes a roof 138 and is made of stainless steel, carbide, titanium or some other high performance metal. Housing 130 is formed with an opening 132 leading into a passage 140 running therethrough that is sized for selectively receiving free end 116 of wire 115. Passage 140 then leads to an opening 134 including an upper slot 136 located at the rear end of roof 138. Importantly, a pivotally flexible membrane 142 depends from roof 138 adjacent opening 132 of housing 130 and is otherwise disposed inside passage 140.

In assembly, an optician first prepares a pair of sunglass lenses 119 similar in size, shape and design to the lenses and/or frame of a wearer's regular eyeglasses. Then, utilizing clip unit 111 depicted in FIGS. 8–14, wire 115 is wrapped around lens 119 and its free end 116 is fed through opening 132 and into passage 140 of corresponding locking unit 117. Then, end 116 of wire 115 is fed through opening 134 and up through slot 136, as shown in FIG. 10.

Figure 12:
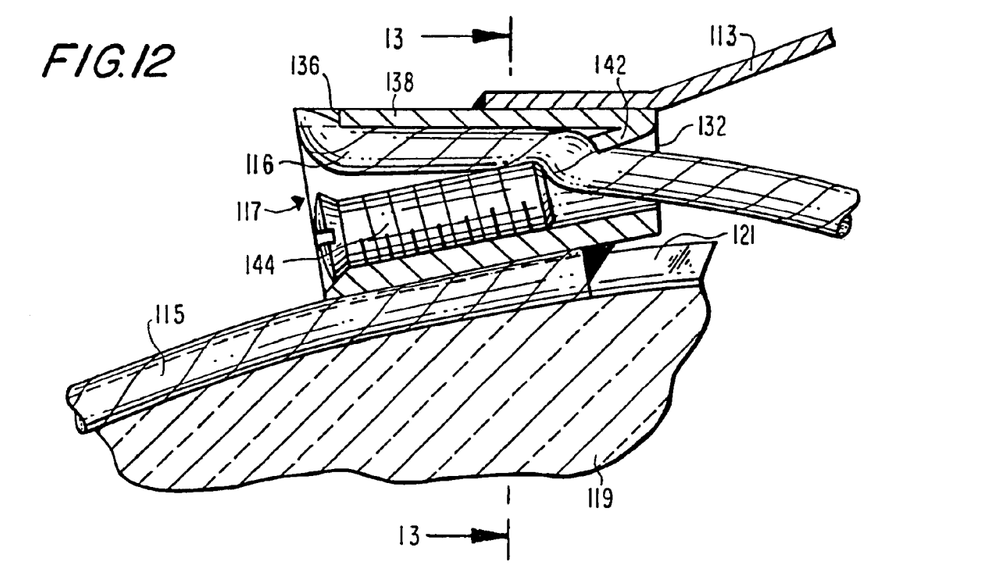
FIG. 12 is a cross-sectional view taken along line 12—12 of FIG. 11.

In order to lock wire end 116 inside locking unit 117, a set screw 144 is used. Screw 144 is threadingly inserted through screw opening 146 at the rear of housing 130 and longitudinally through passage 140, as best shown in FIG. 12. Screw 144 has a tip or end which pinches against wire 115 in order to secure the same in position. In addition, because of this pinching of screw 144 against wire 115, membrane 142 is flexed or pivoted upwardly, thereby also pinching end 116 of wire 115 along the opposite side thereof. As a result, wire 115 is maintained in a secure and fixed position within housing 130 of locking unit 117. Alternatively, locking unit 117 may be used in the assembly of an eyeglass frame itself in which the lens openings are defined by flexible eye wire such as a multi-filament cable, as described later on.

As can be appreciated, with respect to the embodiment of FIGS. 8–14, whether used in the assembly of a clip element or an eyeglass frame, in order to remove excess wire, once screw 144 has been disposed inside passage 140 for pinching against end 116 of wire 115, excess wire may be cut or removed so that wire 115 sits inside slot 136 and flush along roof 138, as best shown in FIG. 12.

Alternatively, locking unit 117 may be used in the assembly of an eyeglass frame itself, where the lens openings are defined by a flexible eyewire such as a multi-filament cable, as described hereinbelow.

Figure 15:
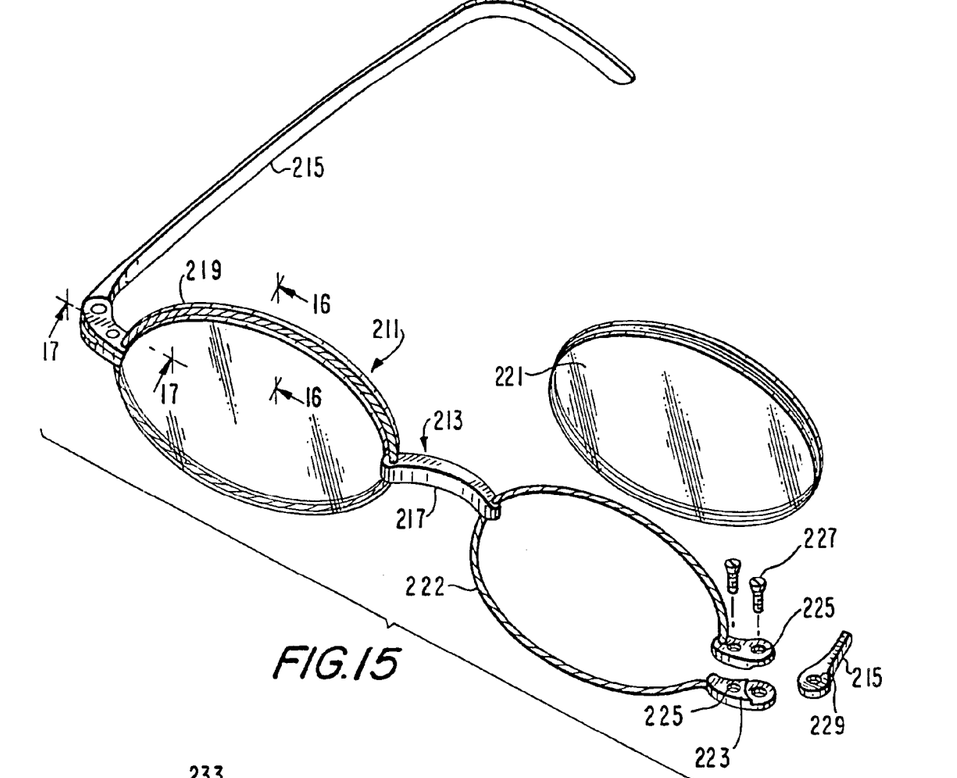
FIG. 15 is a perspective view of an eyeglass frame made in accordance with the invention.
Figures 16, 17:
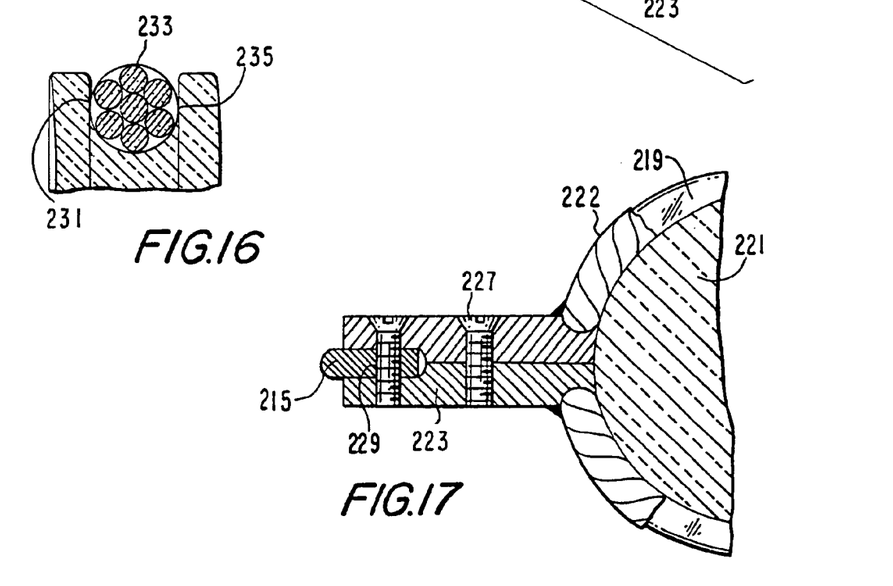
FIG. 16 is a cross-sectional view taken along line 16—16 of FIG. 15.
FIG. 17 is a cross-sectional view taken along line 17—17 of FIG. 15.

Referring now to FIGS. 15, 16 and 17, a specially designed eyeglass frame made in accordance with the invention and generally indicated at 211 is shown. Eyeglass frame 211 comprises a frame assembly 213, a pair of earpieces or temples 215, a bridge or nosepiece 217 and lens openings 219 for receiving a pair of lenses 221. Extending from between each of lens openings 219 and corresponding temples 215 are a pair of hinge bars 223 having a pair of openings 225 through which screws 227 may be threaded. Each of earpiece or temples 215 is hingedly received between hinge bars 223 at either end of frame assembly 213. Each of temples 215 includes an opening 229 which is aligned with the outer openings 225 of hinge bars 223. Screw 227 is then past through all three openings so that temple 215 is hingedly engaged to the end of frame assembly 213, as shown in FIG. 15.

Significantly, each of lens openings 219 comprises a cable 222 made from a multi-filament material such as a multi-filament cable, preferably made from a metal or metal alloy, but also from a nylon, polymer, resin, natural fiber or other naturally occurring or man-made material, as is well known. The preferred multi-filament material is multi-filament cable comprising a plurality of filaments 233 (see FIG. 16), and retained in a casing 235. The cable is extremely flexible and strong so that it can be easily wrapped around lens 221 in a secure fashion, as described below and its length may be adjusted in dimension (by, for example, cutting away excess cable) to accommodate any shape or sized lens. When frame assembly 213 is designed with different shaped or sized lenses, cable 222 may be easily replaced and molded in shape to wrap securely around the new lenses. Preferably, the multi filament cable 222 has a thickness of between about 0.1 and 3.0 mm, and more preferably of between about 0.1 and 0.6 mm. The multi-filament cable used in this aspect of the invention has superior flexibility and strength as compared to conventional wires.

As shown in FIGS. 16 and 17, each of lenses 221 received within lens openings 219 has an outer edge formed with a groove 231 in which multi-filament cable 222 defining lens openings 219 is abutingly and hiddenly received. It is noted that the ends of the multi-filament cable are welded to hinge bars 223, as shown in FIG. 17.

The eyeglass frame described in FIGS. 15–17 is advantageous since—it is easier for the optician/technician to assemble—it gives the appearance of a rimless frame use—it is much stronger than a mono-filament cable or wire—it enables lens shapes of varying size and configuration—it has superior flexibility—it is much lighter than a conventional frame.

Referring now to FIGS. 18–21, an alternative embodiment of a specially designed eyeglass frame made in accordance with the invention and generally indicated at 311 is shown. Eyeglass frame 311 comprises a frame assembly 313, a pair of ear pieces/temples 315, a bridge/nose piece 317, and lens openings 319 for receiving a pair of lenses 321. Extending from each lens opening 319 is a pair of hinge bars 323A, 323B, each having a pair of openings 325A and 325B through which screws 327 may be threaded. Each ear piece/temple 315 is hingedly received between hinge bars 323A and 323B at either end of frame assembly 313 and in a manner similar to the embodiment depicted in FIGS. 15–17.

Figures 18, 19:
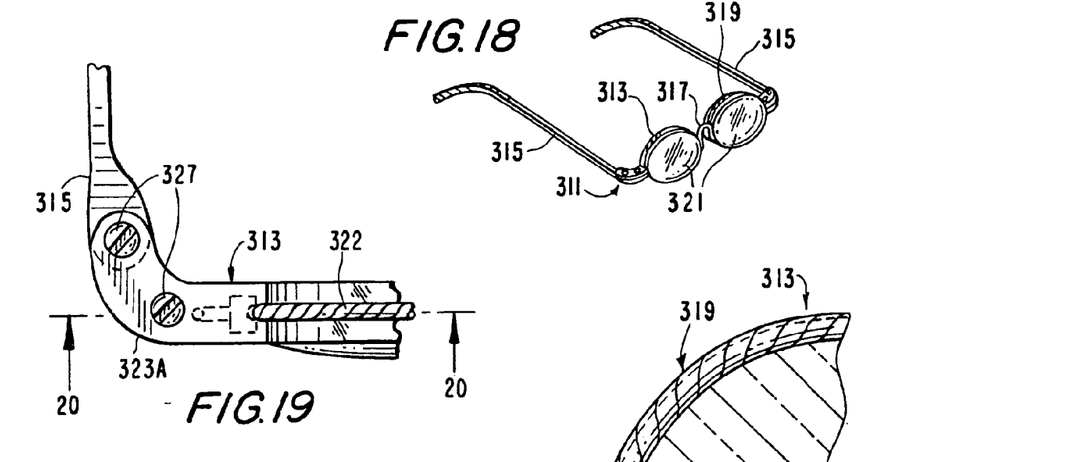
FIG. 18 is a perspective view of an alternate embodiment of eyeglass frame made in accordance with the invention.
FIG. 19 is a top plan view of the eyeglass frame shown in FIG. 18.
Figures 20, 22:
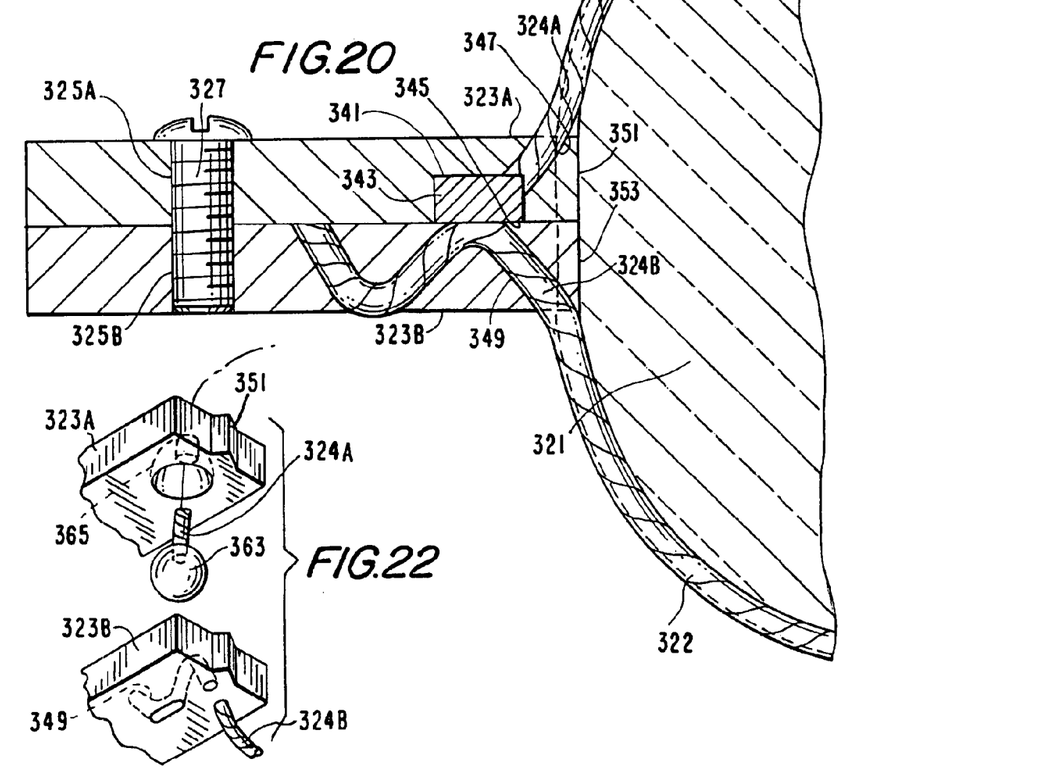
FIG. 20 is a cross-sectional view taken along lines 20—20 of FIG. 18.
FIG. 22 is an exploded perspective view of a portion of an alternative embodiment of an eyeglass frame made in accordance with the invention.

Significantly, each lens opening 319 comprises a cable 322 having ends 324A and 324B and made from a multi-filament material such as a multi-filament cable, as described in detail with respect to the embodiment of FIGS. 15–17. As shown in FIGS. 19 and 20, lens 321 is received within lens opening 319 defined by multi-filament cable 322. Lens 321 has an outer edge formed with a groove 331 (see FIG. 21) in which multi-filament cable 322 defining lens opening 319 is abuttingly and hiddenly received.

Figure 21:
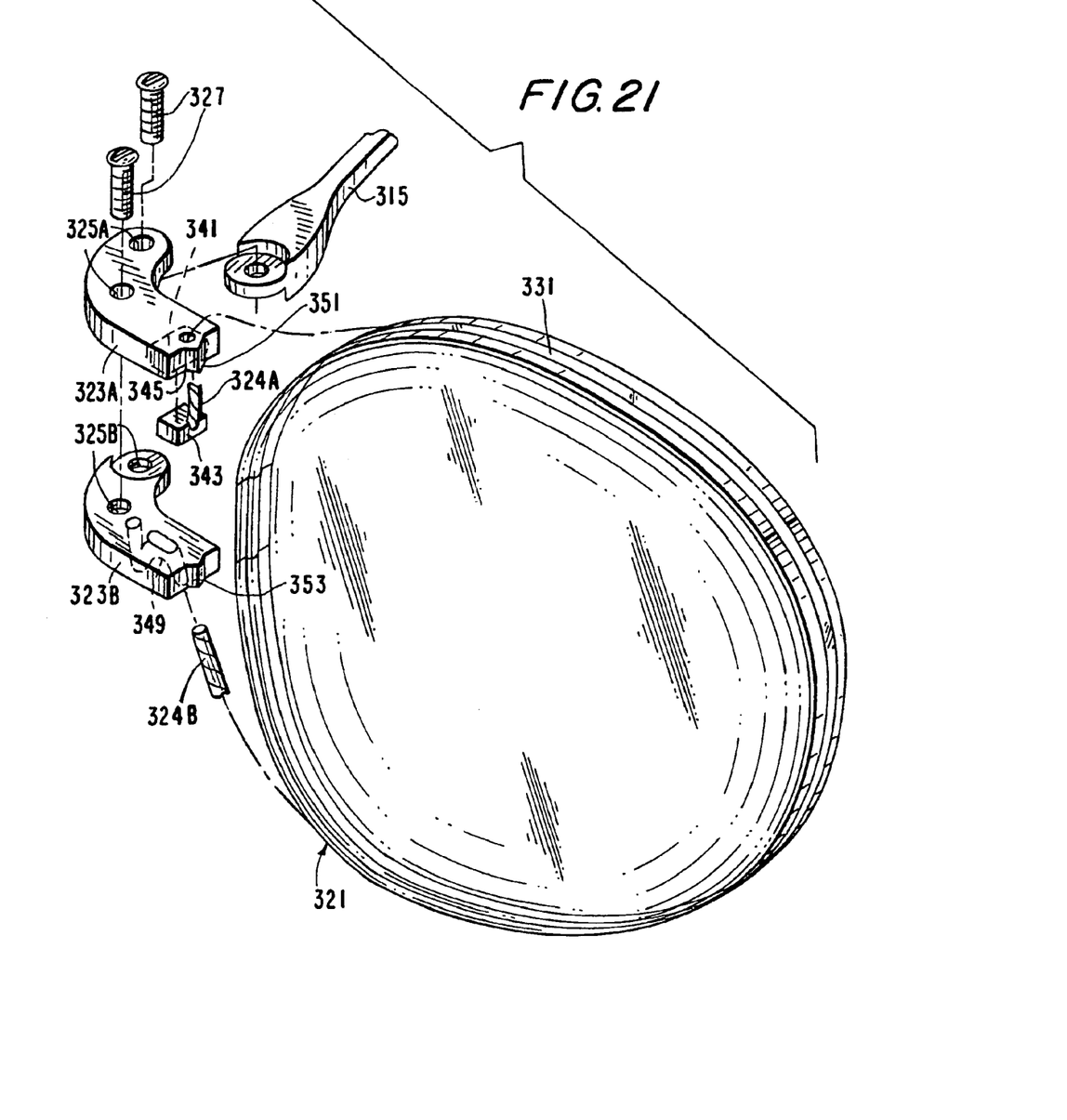
FIG. 21 is an exploded perspective view of a portion of the eyeglass frame shown in FIG. 18.

Rather than welding the ends of multi-filament cable 322 to hinge bars 323A and 323B, as described with respect to the embodiment of FIGS. 15–17, ends 324A, 324B of cable 322 are coupled to bars 323A and 323B by a "ball and chain" locking design as is, for example depicted in FIG. 20 and also FIG. 22. In particular, as best shown in FIGS. 20 and 21, upper hinge bar 323A is formed with a rectangularly configured recess 341 accessible from along the underside of hinge bar 323A by means of an opening 345. Extending from recess 341 to the top side of hinge bar 323A is an angularly directed tubular opening 347 sized for receiving end 324A multi-filament cable 322.

In assembly, end 324A of cable 322 is fixedly engaged to a rectangularly shaped anchoring block 343 (See FIGS. 20–21). Accordingly, and in direction away from the underside of hinge bar 323A, cable 322 is threaded through opening 347 with block 343 matingly engaged within recess 341 in order to lock end 324A of cable 322 therewithin. On the other hand, end 324B of cable 322 is snaked through an undulating wire opening 349 formed within bottom hinge bar 323B and beginning adjacent the forward bottom edge thereof, as best shown in FIG. 20 and FIG. 21. As a result, end 324B of cable 322 is locked in position within bottom hinge bar 323B.

Excess cable 322 may be cut or removed along end 324B so that cable 322 fits properly around lens 321.

It is noted that the forward ends of hinge bars 323A and 323B are formed with nipple elements 351 and 353, as best shown in FIG. 21. Nipple elements 351 and 353, in assembly, are vertically aligned with one another and otherwise are matingly received within groove 331 formed along the outer edge of lens 321 and between ends 324A, 324B of cable 322 in order to facilitate engagement of hinge bars 323A and 323B to the overall assembly.

Referring now to FIG. 22, an alternative version of the "ball and chain" locking design is shown in which upper hinge bar 323A is formed with a spherically shaped recess 365 for receiving an anchoring ball member 363 fixedly attached to end 324A of cable 322. It is noted that recess 365 can have a three-dimensional configuration for receiving a corresponding member 363 of a similar configuration without departing from the inventive concept. Alternatively, instead of end 324A of cable 322 being fixed to an anchoring member, end 324A simply can be tied in a knot form in order to lock end 324A in recess 365 formed in hinge bar 323A.

Figures 23, 24:
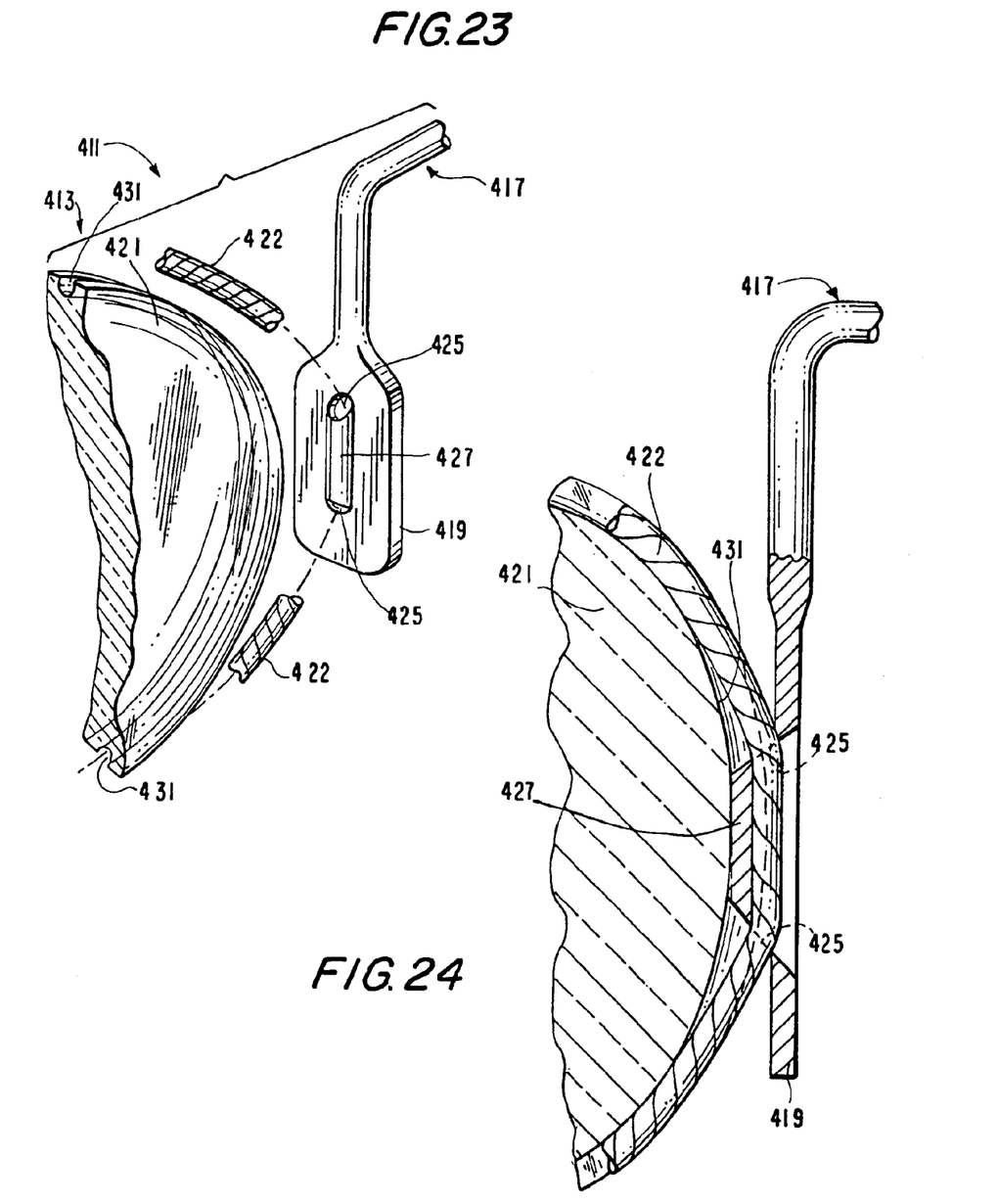
FIG. 23 is a front perspective view illustrating the nose piece and lens portion of an additional embodiment of an eyeglass frame made in accordance with the invention.
FIG. 24 is a cross-sectional view showing the nose piece and lens of the FIG. 23 assembly.

Referring now to FIGS. 23–24, still another embodiment of an eyeglass frame, made in accordance with the invention and generally indicated at 411, is shown. Eyeglass frame 411 comprises a frame assembly 413, a pair of ear pieces/temples (not shown), a bridge/nose piece 417, and lens openings for receiving a pair of lenses 421 (one of which is shown). As before, each lens opening comprises a cable 422 made from a multi-filament material such as a multi-filament cable as described in more detail with respect to the embodiment of FIGS. 15–17. Each lens 421 received within the lens openings defined by cable 422 has an outer edge formed with a groove 431 in which multi-filament cable 422 is abuttingly and hiddenly received.

In the embodiment of FIGS. 23–24, in contrast to the embodiment of FIGS. 15–17, as described hereinabove, bridge/nose piece 417 includes a flexible projection 419 extending downwardly at either end and abutting against the outer edge of the corresponding lens 421. Each flexible projection 419 is formed with a vertically extending wire-shaped nipple guide 427 sized for engagement within groove 431 of lens 421 and between cable 422, and a pair of holes 425 located at either end of nipple 427. In order to selectively couple cable 422 (defining the lens opening) to nose piece 417, cable 422 is threaded through holes 425, as best shown in FIG. 23.

Figure 25:
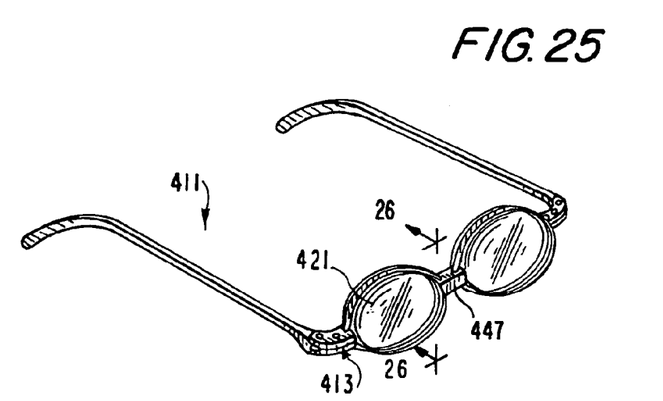
FIG. 25 is a perspective view of a further embodiment of the inventive eyeglass frame.
Figure 26:
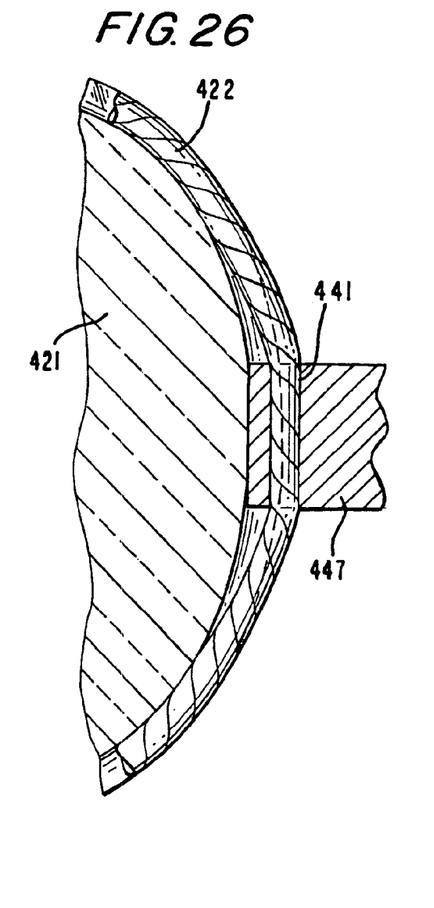
FIG. 26 is a cross-sectional view taken along line 26—26 of FIG. 25.
Figure 27:
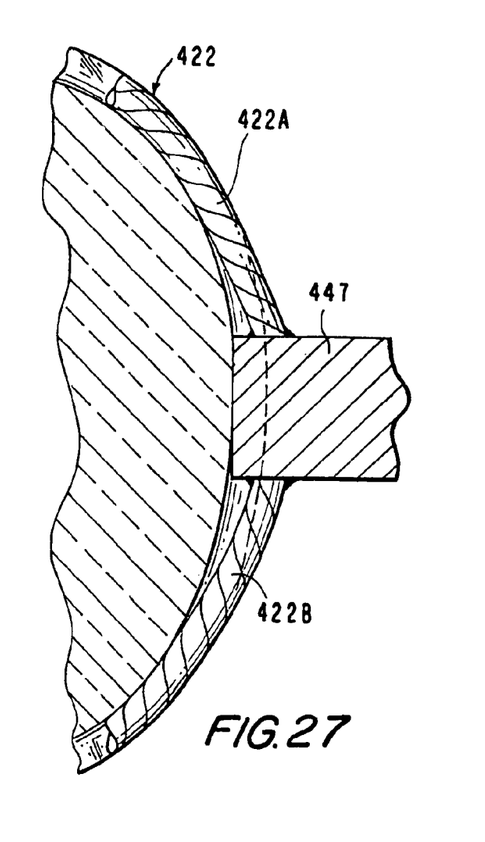
FIG. 27 is a cross-sectional view of the nose piece and lens portion of still another embodiment of an eyeglass frame made in accordance with the invention.

As an alternative to the design shown in FIGS. 23–24, and in order to couple cable 422 to a conventionally designed nose piece/ bridge 447, the latter is formed with a channel or slot 441 through which cable 422 runs therethrough, as best shown in FIGS. 25–26. In FIG. 27, cable 422 is shown defined into two segments 422A and 422B and soddered at the ends thereof to bridge 447 in order to provide a further alternative mechanism for coupling thereto.

It will thus be seen that the objects set forth above, among those made apparent from the preceding description, are efficiently attained, and, since certain changes may be made in the above system and product without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. An eyewear system comprising at least one eyewear lens having a perimeter of any size, shape or dimension, a multi-filament cable for wrapping around said at least one lens perimeter, and a locking mechanism for maintaining said cable tightly wrapped around said perimeter.

2. The system of claim 1, wherein said perimeter of said at least one lens has an edge formed with a groove therealong in which said cable is engagingly received.

3. The system of claim 1, wherein said cable is made of a metal or metal alloy.

4. The system of claim 1, wherein said cable is made of material selected from the group including nylon, polymer, resin, natural cable, and fiber optic material.

5. The system of claim 1, wherein said cable has a thickness of between 0.1 and 3.0 mm.

6. The system of claim 5, wherein said cable has a thickness of between 0.1 and 0.6 mm.

7. The system of claim 1, wherein said cable comprises a plurality of filaments retained in a casing.

8. The system of claim 1, wherein said eyewear system is an eyeglass clip assembly.

9. The system of claim 1, wherein said at least one eyewear lens comprises a pair of eyewear lenses.

10. The system of claim 9, further including a nose bridge or tension bar disposed between said lenses, and a temple connected to each of said lenses.

11. The system of claim 10, wherein a first multi-filament cable is wrapped around the perimeter of one of said lenses and second multi-filament cable is wrapped around the perimeter of the other of said lenses.

12. The system of claim 11, wherein a first locking mechanism maintains said first cable around the perimeter of one of said lenses and a second locking mechanism maintains the second cable around the perimeter of the other of the lenses.

13. The system of claim 12, wherein at least one of said locking mechanism is located either along or near said nose bridge or tension bar.

14. The system of claim 12, wherein at least one of said locking mechanism is located either along or near one of said temples.

15. The system of claim 14, wherein at least one of said connected temples is connected at one end thereof to one of said first and second multi-filament cables by means of a hinge element.

16. The system of claim 15, wherein said hinge element incorporates said locking mechanism.

17. The system of claim 1, wherein said locking mechanism comprises a screw locking assembly.

18. The system of claim 17, wherein said screw locking mechanism comprises a screw element for selective engagement with said wrapped cable.

19. The assembly of claim 18, wherein said safety element comprises a flexible membrane associated with said locking mechanism.

20. The system of claim 1, wherein said cable has an end feedable through said locking mechanism such that said cable end is selectively engaged at a location therealong.

21. The assembly of claim 20, further including a safety element for preventing disengagement of said cable.

22. The system of claim 1, wherein said cable has a length which is adjustable in dimension in response to a change in the dimension of said lens perimeter.

23. The system of claim 1, wherein said cable is selectively replaceable.

* * * * *